(12) United States Patent
Kizaki et al.

(10) Patent No.: US 8,662,546 B2
(45) Date of Patent: Mar. 4, 2014

(54) VEHICLE BUMPER STRUCTURE

(75) Inventors: Isamu Kizaki, Fuchu-cho (JP);
Masahiro Asahi, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 1440 days.

(21) Appl. No.: 11/892,802

(22) Filed: Aug. 27, 2007

(65) Prior Publication Data

US 2008/0054655 A1    Mar. 6, 2008

(30) Foreign Application Priority Data

Aug. 31, 2006   (JP) ................................. 2006-234971

(51) Int. Cl.
*B60R 19/34*         (2006.01)
(52) U.S. Cl.
USPC .......................................................... 293/133
(58) Field of Classification Search
USPC ........... 296/187.03, 187.09, 193.09; 293/133, 293/132; 280/784; 188/377
See application file for complete search history.

(56) References Cited

U.S. PATENT DOCUMENTS

| | | | | |
|---|---|---|---|---|
| 3,831,997 A | * | 8/1974 | Myers | 296/187.09 |
| 3,842,222 A | * | 10/1974 | Hogland | 200/61.44 |
| 3,860,258 A | * | 1/1975 | Feustel et al. | 180/312 |
| 3,899,047 A | * | 8/1975 | Maeda et al. | 188/374 |
| 4,023,652 A | * | 5/1977 | Torke | 188/377 |
| 4,152,012 A | * | 5/1979 | Reidelbach et al. | 280/784 |
| 4,194,763 A | * | 3/1980 | Reidelbach et al. | 280/784 |
| 4,465,312 A | * | 8/1984 | Werner | 293/132 |
| 4,468,052 A | * | 8/1984 | Koike | 280/784 |
| 4,961,603 A | * | 10/1990 | Carpenter | 293/102 |
| 5,118,160 A | * | 6/1992 | Kitagawa et al. | 296/187.03 |
| 5,431,445 A | * | 7/1995 | Wheatley | 280/784 |
| 5,727,827 A | * | 3/1998 | Shibuya et al. | 293/155 |
| 5,732,801 A | * | 3/1998 | Gertz | 188/377 |
| 5,803,517 A | * | 9/1998 | Shibuya | 293/120 |
| 5,853,195 A | * | 12/1998 | Le et al. | 280/784 |
| 5,876,077 A | * | 3/1999 | Miskech et al. | 293/132 |
| 5,876,078 A | * | 3/1999 | Miskech et al. | 293/133 |
| 5,984,390 A | * | 11/1999 | Kemp et al. | 293/132 |
| 6,042,163 A | * | 3/2000 | Reiffer | 293/155 |

(Continued)

FOREIGN PATENT DOCUMENTS

| | | |
|---|---|---|
| DE | 195 40 787 | 5/1997 |
| DE | 198 14 842 | 10/1999 |
| DE | 10 2004 002 948 | 8/2005 |
| JP | 6-57751 | 8/1994 |

OTHER PUBLICATIONS

Extended European Search Report issued in corresponding European Patent Application No. 07115148.4, on Dec. 19, 2007.

*Primary Examiner* — Kiran B Patel

(57) ABSTRACT

A vehicle bumper structure includes a pair of left and right crush cans, a bumper beam, an energy absorbing member and a bumper face. Each of the crush cans has an outside wall and an inside wall, the inside wall having higher longitudinal stiffness than the outside wall. When a full-wrap collision occurs at a speed below a specified speed limit, neither of the two crush cans crushes but the energy absorbing member and the bumper beam warp and absorb impact energy. When an offset collision occurs at a speed equal to or above the specified speed limit, on the other hand, one of the crush cans sufficiently crushes and absorbs impact energy in a reliable fashion.

7 Claims, 8 Drawing Sheets

(56) References Cited

U.S. PATENT DOCUMENTS

| | | | |
|---|---|---|---|
| 6,065,786 A * | 5/2000 | Wheatley | 293/109 |
| 6,152,521 A * | 11/2000 | Hayashi et al. | 296/187.09 |
| 6,174,009 B1 * | 1/2001 | McKeon | 293/133 |
| 6,179,355 B1 * | 1/2001 | Chou et al. | 293/132 |
| 6,199,937 B1 * | 3/2001 | Zetouna et al. | 293/136 |
| 6,315,338 B1 * | 11/2001 | Schneider et al. | 293/115 |
| 6,409,239 B1 * | 6/2002 | Tjoelker et al. | 293/133 |
| 6,474,709 B2 * | 11/2002 | Artner | 293/133 |
| 6,485,072 B1 * | 11/2002 | Werner et al. | 293/132 |
| 6,588,830 B1 * | 7/2003 | Schmidt et al. | 296/187.09 |
| 6,595,502 B2 * | 7/2003 | Koch et al. | 267/139 |
| 6,644,701 B2 * | 11/2003 | Weissenborn et al. | 293/120 |
| 6,648,384 B2 * | 11/2003 | Nees et al. | 293/133 |
| 6,773,044 B2 * | 8/2004 | Schambre et al. | 293/118 |
| 6,779,821 B2 * | 8/2004 | Hallergren | 293/133 |
| 6,799,794 B2 * | 10/2004 | Mochidome et al. | 296/187.03 |
| 6,808,215 B2 * | 10/2004 | Sakuma et al. | 293/102 |
| 6,814,381 B1 * | 11/2004 | Frank | 293/133 |
| 6,820,924 B2 * | 11/2004 | Caliskan et al. | 296/187.03 |
| 6,893,063 B2 * | 5/2005 | Harrison et al. | 293/117 |
| 6,929,297 B2 * | 8/2005 | Muller et al. | 293/133 |
| 7,025,410 B2 * | 4/2006 | Kosaka | 296/187.09 |
| 7,066,509 B2 * | 6/2006 | Kollaritsch et al. | 293/133 |
| 7,070,217 B2 * | 7/2006 | Longo | 293/132 |
| 7,201,249 B2 * | 4/2007 | Kosaka | 180/274 |
| 7,222,897 B2 * | 5/2007 | Evans et al. | 293/120 |
| 7,258,392 B2 * | 8/2007 | Frederick et al. | 296/187.09 |
| 7,357,432 B2 * | 4/2008 | Roll et al. | 293/133 |
| 7,389,860 B2 * | 6/2008 | Abu-Odeh et al. | 188/377 |
| 7,407,192 B2 * | 8/2008 | Yoshimura | 280/784 |
| 7,469,956 B2 * | 12/2008 | Yasuhara et al. | 296/187.09 |
| 7,488,016 B2 * | 2/2009 | Nakamae et al. | 293/117 |
| 7,490,877 B2 * | 2/2009 | Asahi et al. | 293/155 |
| 2002/0101086 A1 * | 8/2002 | Koch et al. | 293/133 |
| 2003/0075952 A1 * | 4/2003 | Mochidome et al. | 296/189 |
| 2003/0080573 A1 * | 5/2003 | Marijnissen et al. | 293/132 |
| 2004/0160071 A1 * | 8/2004 | Suganuma et al. | 293/132 |
| 2005/0104392 A1 * | 5/2005 | Liebhard et al. | 293/132 |
| 2005/0253403 A1 * | 11/2005 | Longo | 293/133 |
| 2006/0237976 A1 * | 10/2006 | Glasgow et al. | 293/132 |
| 2006/0284431 A1 * | 12/2006 | Evans et al. | 293/121 |
| 2006/0290150 A1 * | 12/2006 | Roll et al. | 293/133 |
| 2007/0024069 A1 * | 2/2007 | Takagi et al. | 293/102 |
| 2007/0056819 A1 * | 3/2007 | Kano et al. | 188/371 |
| 2007/0069535 A1 * | 3/2007 | Mohapatra et al. | 293/121 |
| 2007/0181393 A1 * | 8/2007 | Suzuki | 188/377 |
| 2007/0187960 A1 * | 8/2007 | Evans | 293/133 |
| 2008/0012363 A1 * | 1/2008 | Nakamae et al. | 293/117 |
| 2008/0012386 A1 * | 1/2008 | Kano et al. | 296/187.03 |
| 2008/0042455 A1 * | 2/2008 | Nees | 293/132 |
| 2008/0048462 A1 * | 2/2008 | Zabik | 293/120 |
| 2008/0098601 A1 * | 5/2008 | Heinz et al. | 29/897.2 |
| 2008/0106107 A1 * | 5/2008 | Tan et al. | 293/133 |
| 2008/0185852 A1 * | 8/2008 | Suzuki et al. | 293/132 |
| 2008/0224487 A1 * | 9/2008 | Wang et al. | 293/132 |
| 2008/0238146 A1 * | 10/2008 | Nusier et al. | 296/193.09 |
| 2009/0026777 A1 * | 1/2009 | Schmid et al. | 293/133 |

* cited by examiner

VEHICLE BUMPER STRUCTURE

BACKGROUND OF THE INVENTION

1. Field of the Invention

The present invention relates to a bumper structure of a vehicle provided with a pair of left and right crush cans.

2. Description of the Related Art

A conventionally known bumper structure of a vehicle includes a transversely extending bumper beam attached to forward ends of left and right front side frames, an energy absorbing member made of urethane or the like attached to a front side of the bumper beam and a bumper face disposed in front of the energy absorbing member as described in Japanese Utility Model Publication No. 1994-57751, for example.

In today's automotive industry, however, it is becoming a mainstream trend for a vehicle to employ a bumper structure including a pair of left and right crush cans attached to forward ends of left and right front side frames, a bumper beam attached to forward ends of the left and right crush cans, an energy absorbing member and a bumper face, the energy absorbing member and the bumper face being constructed essentially the same way as in the aforementioned conventional bumper structure. The crush cans employed in this new type of bumper structure deform compressively, or crush, due to an impact force produced in the event of a vehicle collision, thereby absorbing impact energy in an effective fashion.

Generally, there are two types of frontal collisions. These are full-wrap collisions in which an obstacle, such as another vehicle, collides with own vehicle's bumper structure from a front direction, involving almost an entire bumper width, and offset collisions in which an obstacle collides with the bumper structure, involving part (left or right side) of the bumper width. In the case of a full-wrap collision, the impact force is divided approximately into halves and exerted almost equally on the two crush cans whereas, in the case of an offset collision, the impact force concentrates on one of the two crush cans.

A more recent requirement in bumper design is for a bumper structure which is constructed in such a way that an energy absorbing member and a bumper face would warp (deform) and absorb impact energy without causing a pair of left and right crush cans to crush in the event of a low-speed full-wrap collision, so that cost and time needed for repairing the damaged crush cans would be reduced. It would be possible to meet this requirement by designing the crush cans to have an increased overall stiffness in a longitudinal direction, for example.

If the overall longitudinal stiffness of the crush cans is increased, however, neither of the crush cans will crush enough in the event of an offset collision, especially in a low-speed offset collision, thus creating a possibility that the impact energy might not be sufficiently absorbed. To be more specific, the impact energy produced by an offset collision can hardly be absorbed by warpage of the energy absorbing member and the bumper face and would be exerted on one of the two crush cans in a concentrated fashion. If the stiffness of the crush can is too high, the crush can will not crush sufficiently and, as a consequence, the impact force will be transmitted directly to one of the front side frames. This will cause a damage to the front side frame and an eventual increase in repairing cost.

If the overall longitudinal stiffness of the crush cans is reduced to cope with the aforementioned problem, one of the crush cans will crush in the event of a low-speed offset collision, thereby absorbing the impact force effectively. If the crush cans are so constructed, however, both of the crush cans will crush even in the event of a low-speed full-wrap collision. Then, it will become impossible to satisfy the aforementioned requirement for the bumper structure whose energy absorbing member and bumper face would warp and absorb the impact energy without causing the pair of crush cans to crush to permit a reduction in repairing cost caused by the low-speed full-wrap collision.

SUMMARY OF THE INVENTION

In light of the foregoing, it is an object of the invention to provide a vehicle bumper structure in which an energy absorbing member and a bumper face warp and thereby absorb impact energy without causing a pair of crush cans to crush when a full-wrap collision occurs at a speed below a specified speed limit, whereas one of the crush cans sufficiently crushes and thereby absorbs impact energy in a reliable fashion when an offset collision occurs at a speed equal to or above the specified speed limit.

To achieve the aforementioned object, a vehicle bumper structure of the invention includes a pair of forward-directed left and right crush cans attached respectively to forward ends of left and right front side frames, a bumper beam attached to forward ends of the left and right crush cans to extend transversely therebetween, an energy absorbing member attached to a front side of the bumper beam at least in an area excluding left and right end portions thereof, the energy absorbing member having lower stiffness than the bumper beam and the crush cans, and a bumper face disposed in front of the energy absorbing member. In this vehicle bumper structure, each of the crush cans has an outside wall facing outward and an inside wall facing inward, the inside wall having higher longitudinal stiffness than the outside wall.

These and other objects, features and advantages of the invention will become more apparent upon a reading of the following detailed description in conjunction with the accompanying drawings.

DETAILED DESCRIPTION OF THE PREFERRED EMBODIMENT OF THE INVENTION

Figure 1:
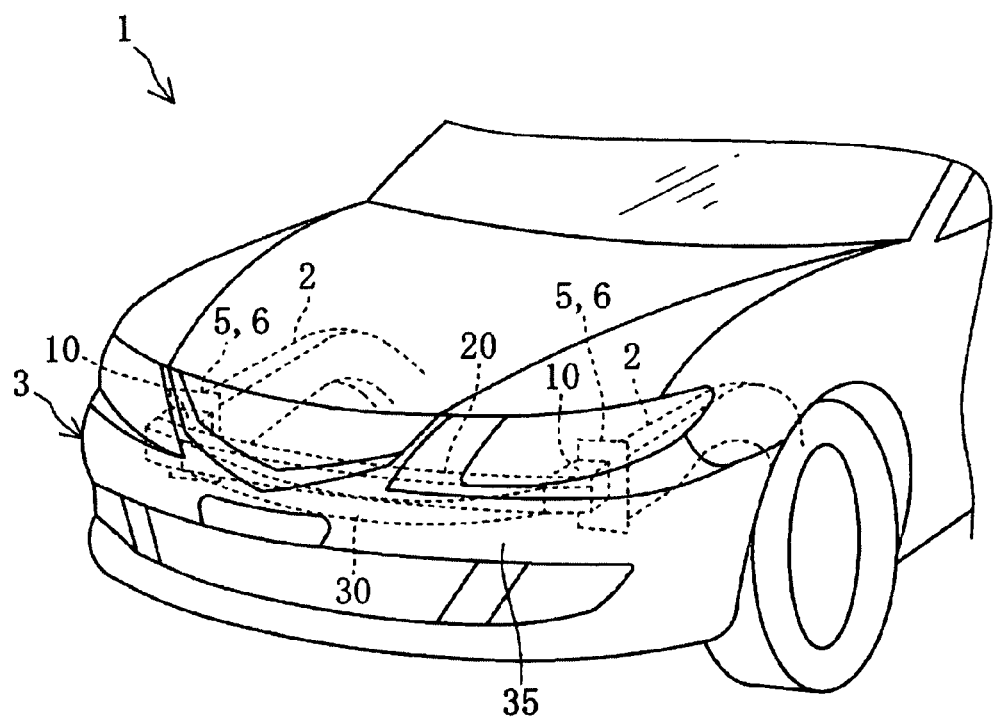
FIG. 1 is a perspective view showing a front portion of a vehicle provided with a bumper structure according to a preferred embodiment of the invention.
Figure 2:
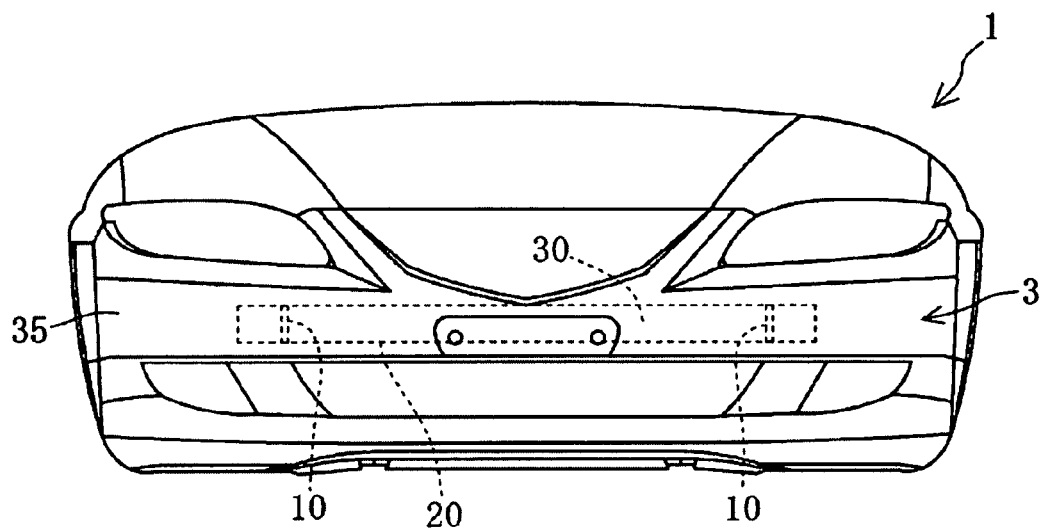
FIG. 2 is a front view of the vehicle of FIG. 1.
Figure 3:
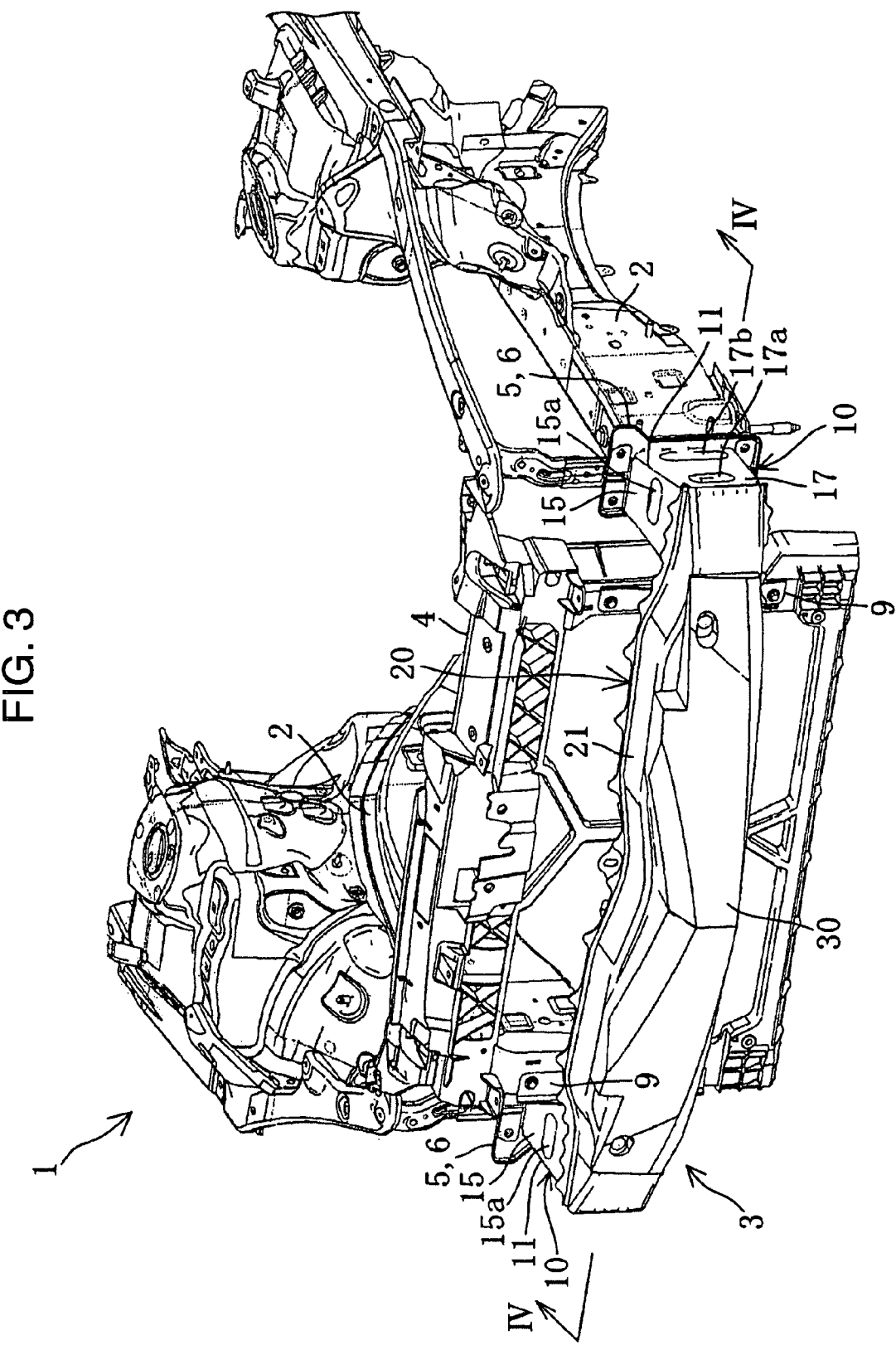
FIG. 3 is a perspective view showing the construction of front side frames and the bumper structure of the vehicle of FIG. 1.
Figure 4:
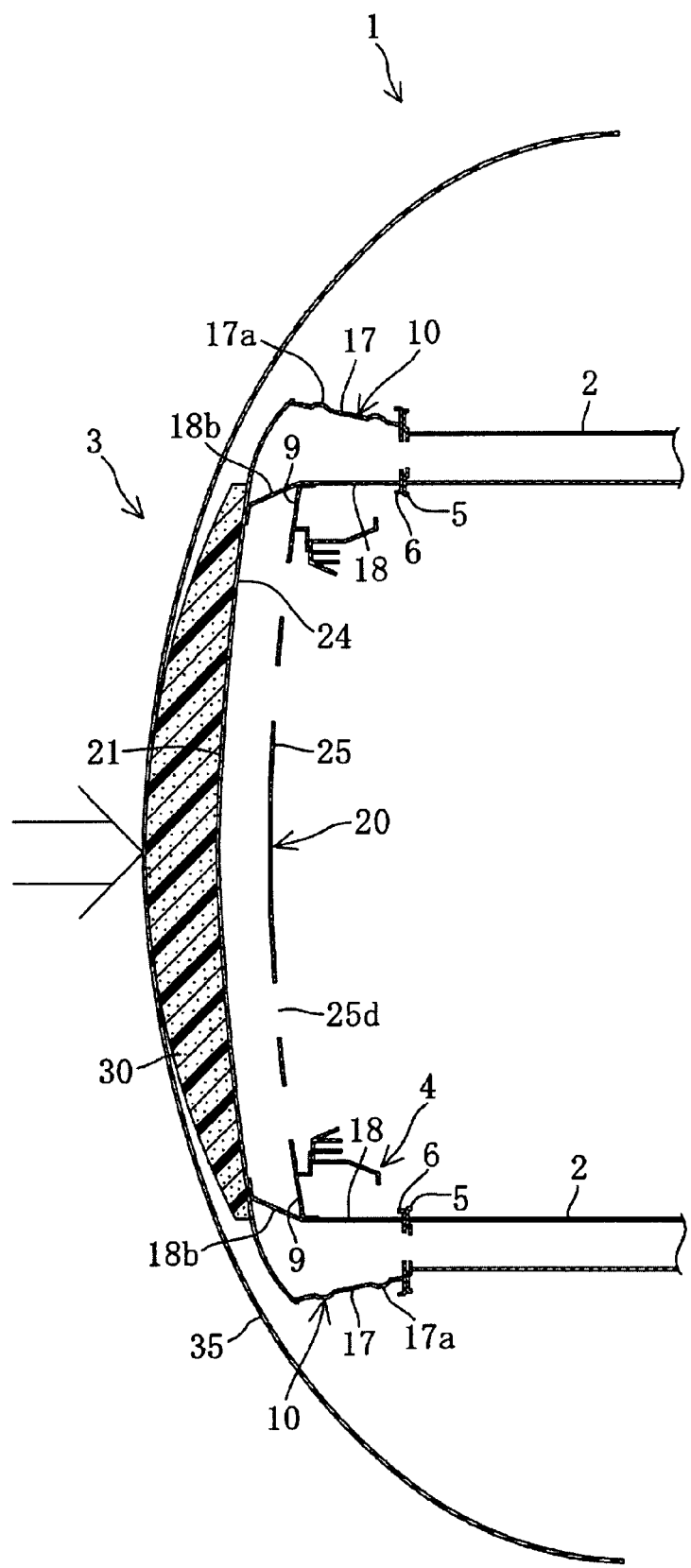
FIG. 4 is a cross-sectional view of the front portion of the vehicle taken along lines IV-IV of FIG. 3.

A specific embodiment of the present invention is now described with reference to the accompanying drawings.

Referring to FIGS. 1 to 4, a vehicle 1 is provided in a front portion thereof with a pair of left and right front side frames 2, a bumper structure 3 disposed at the front of the front side frames 2, and a shroud 4 to which an unillustrated radiator and condenser of an air conditioner are affixed. The front side frames 2, each forming a closed section, are individually provided with flanges 5 affixed to forward ends of the individual front side frames 2, each of the flanges 5 extending in upward, downward, leftward and rightward directions.

The bumper structure 3 of the embodiment is now described in detail.

As depicted in FIGS. 1 to 9, the bumper structure 3 includes a pair of forward-directed left and right metallic crush cans 10 attached respectively to the forward ends of the left and right front side frames 2, a metallic bumper beam 20 attached to forward ends of the left and right crush cans 10 to extend transversely therebetween, an energy absorbing member 30 made of a plastic foam material having lower stiffness than the bumper beam 20 and the crush cans 10, the energy absorbing member 30 being attached to a front side of the bumper beam 20 in an area excluding left and right end portions thereof, and a plastic bumper face 35 disposed in front of the energy absorbing member 30.

Each of the crush cans 10 includes a structural member 11 having a U-shaped cross section (hereinafter referred to as the U-section member 11) of which open side is directed inward toward a centerline of the vehicle 1 and a vertical flat plate member 12 of which rear portion is fitted into the inwardly open side of the U-section member 11. The flat plate member 12 of each crush can 10 has inwardly bent flanges along upper and lower inner edges of the flat plate member 12. The U-section member 11 and the flat plate member 12 of each crush can 10 together form a closed section as the upper and lower flanges of the flat plate member 12 are joined to upper and lower inner end portions of the U-section member 11, respectively. A flange 6 extending upward, downward, leftward and rightward is affixed to a rear end of each crush can 10. This flange 6 is affixed to the flange 5 at the forward end of the front side frame 2 on each side by a plurality of bolts.

Each of the crush cans 10 has an upper wall 15, a lower wall 16, an outside wall 17 facing outward and an inside wall 18 facing inward. The upper wall 15, the lower wall 16 and the outside wall 17 of each crush can 10 are one-piece formed by the aforementioned U-section member 11 while the inside wall 18 is formed by the aforementioned flat plate member 12. The upper wall 15 of each crush can 10 extends frontward while gradually sloping downward so that the distance between the upper wall 15 and the lower wall 16 gradually decreases frontward. In the upper wall 15 and the lower wall 16, there is formed one each laterally elongate bead portion 15a, 16a, respectively. Further, an upwardly bent flange 15b is formed at an extreme forward end of the upper wall 15 of each crush can 10 while a downwardly bent flange 16b is formed at an extreme forward end of the lower wall 16.

Figure 5:
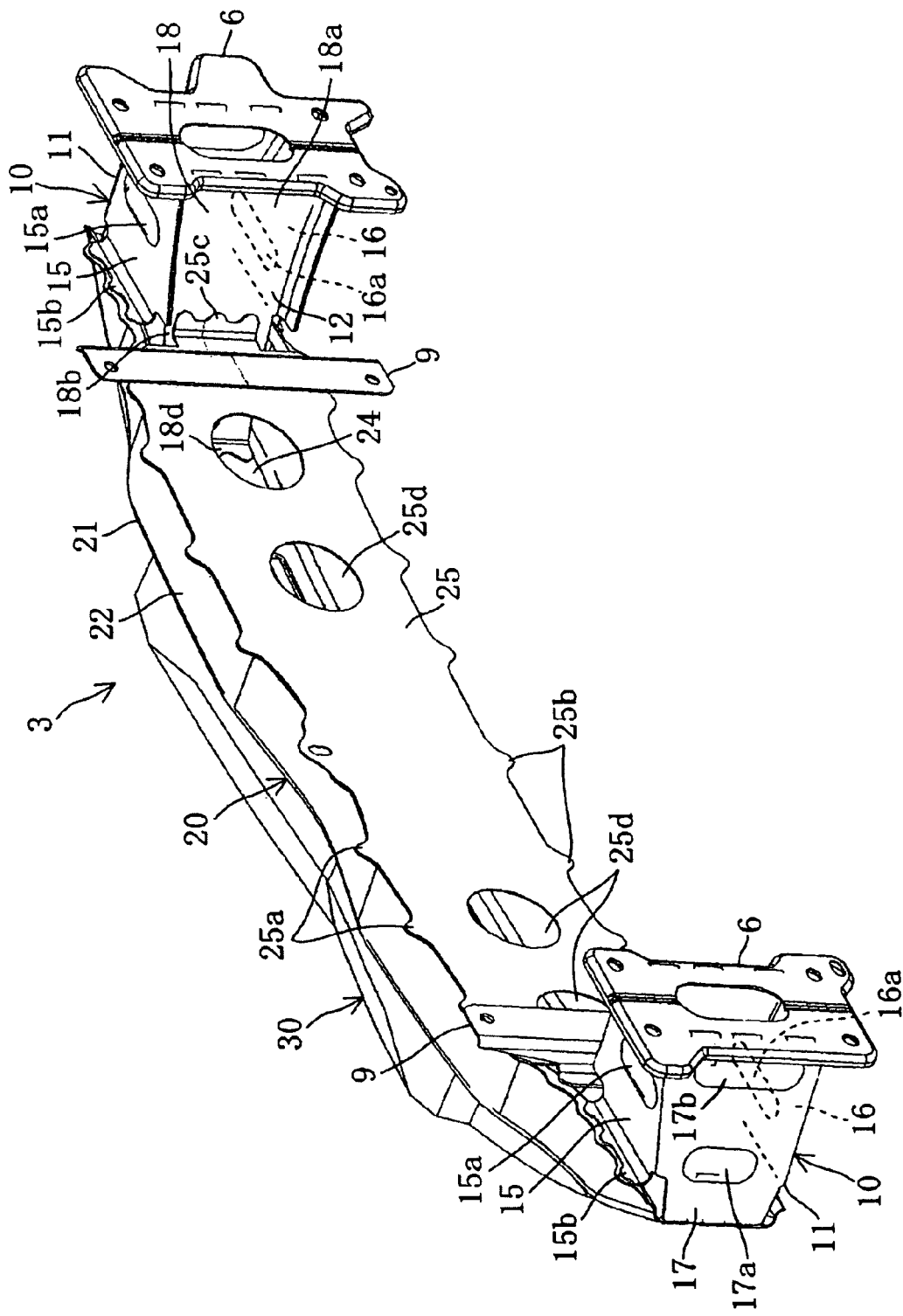
FIG. 5 is a perspective view of the bumper structure as seen obliquely from behind.
Figure 8:
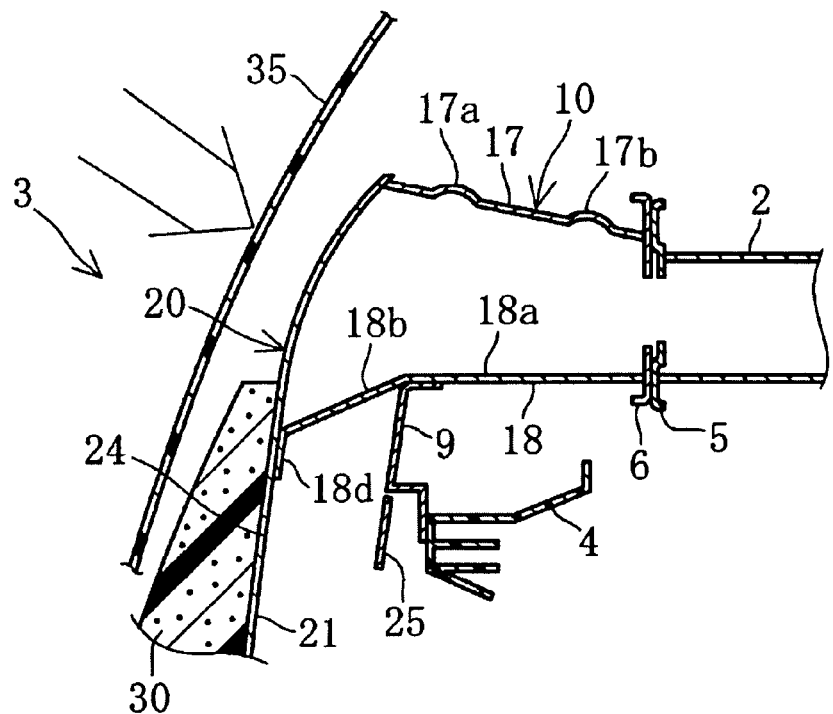
FIG. 8 is an enlarged fragmentary plan view in section showing a principal part of the bumper structure of FIG. 3.

The outside wall 17 of each crush can 10 is bent to deflect frontwardly outward at an angle of about 10 degrees from a longitudinal direction, for example. There are formed a plurality of (e.g., two) vertically extending unstiffening bead portions 17a, 17b in the outside wall 17 of each crush can 10. These unstiffening bead portions 17a, 17b which are separated by an appropriate distance are formed by bending to project more outward than the other portion of the outside wall 17 as depicted in FIG. 8. To add, the unstiffening bead portions 17a, 17b are made to extend vertically over a specific range as depicted in FIG. 5. The provision of the unstiffening bead portions 17a, 17b thus formed permits the outside wall 17 of each crush can 10 to easily deform compressively when acted upon by a compressive stress in the longitudinal direction, that is, at right angles to the extending direction of the unstiffening bead portions 17a, 17b. As can be seen form FIG. 5, the rear unstiffening bead portion 17b is made longer than the front unstiffening bead portion 17a.

The inside wall 18 of each crush can 10 has a basal inside wall portion 18a located generally at the same longitudinal position as the upper wall 15, the lower wall 16 and the outside wall 17 and an elongated portion 18b extending more frontward than the other portions (i.e., the upper wall 15, the lower wall 16, the outside wall 17 and the basal inside wall portion 18a) of each crush can 10 from a forward end of the basal inside wall portion 18a. The basal inside wall portion 18a of the inside wall 18 of each crush can 10 extends generally straight along the longitudinal direction, whereas the elongated portion 18b of the inside wall 18 is bent to deflect frontwardly inward at an angle of about 20 degrees from the longitudinal direction, for example.

Figure 6:
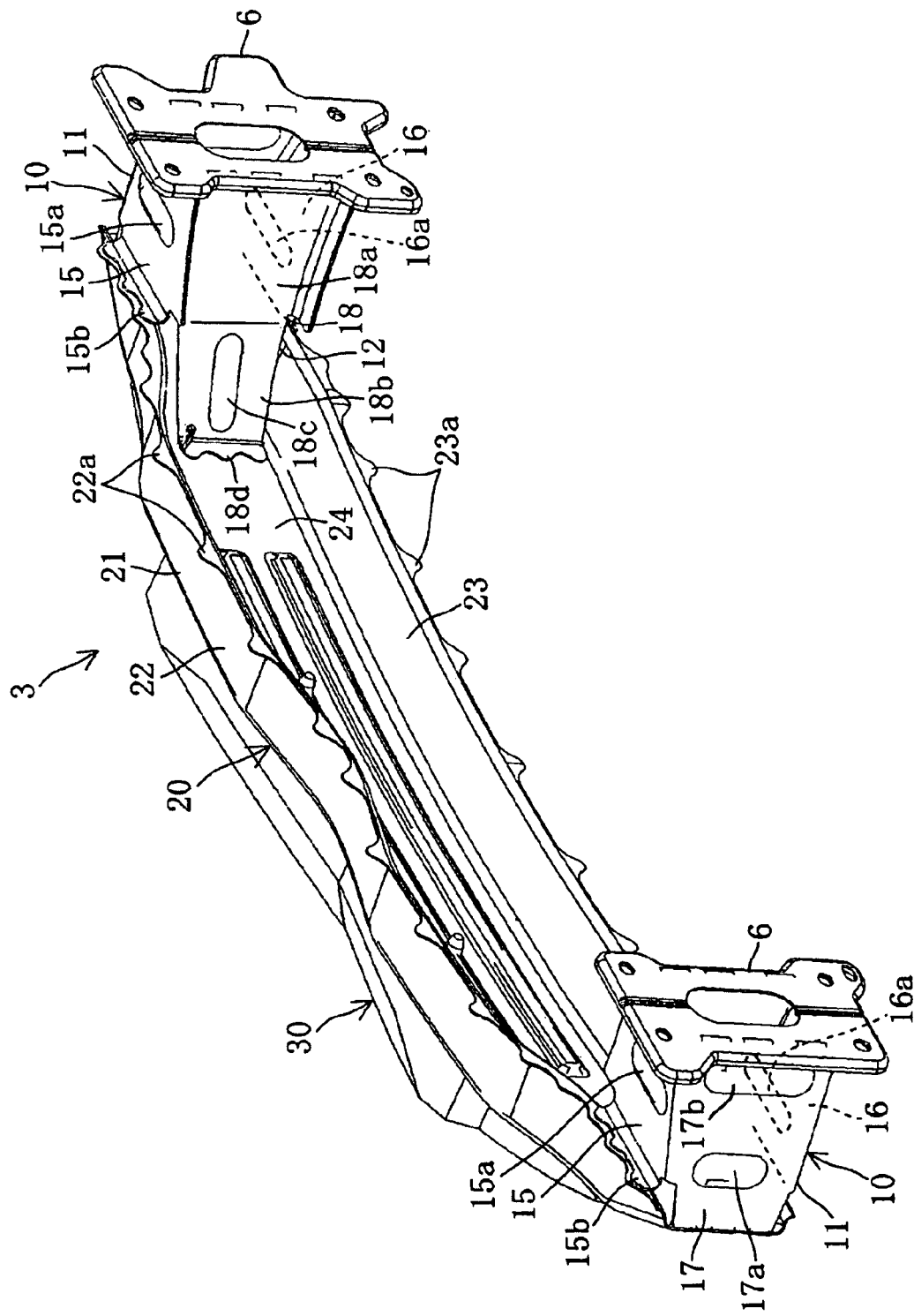
FIG. 6 is a perspective view of the bumper structure as seen obliquely from behind with a cover plate removed from a bumper beam.
Figure 7:
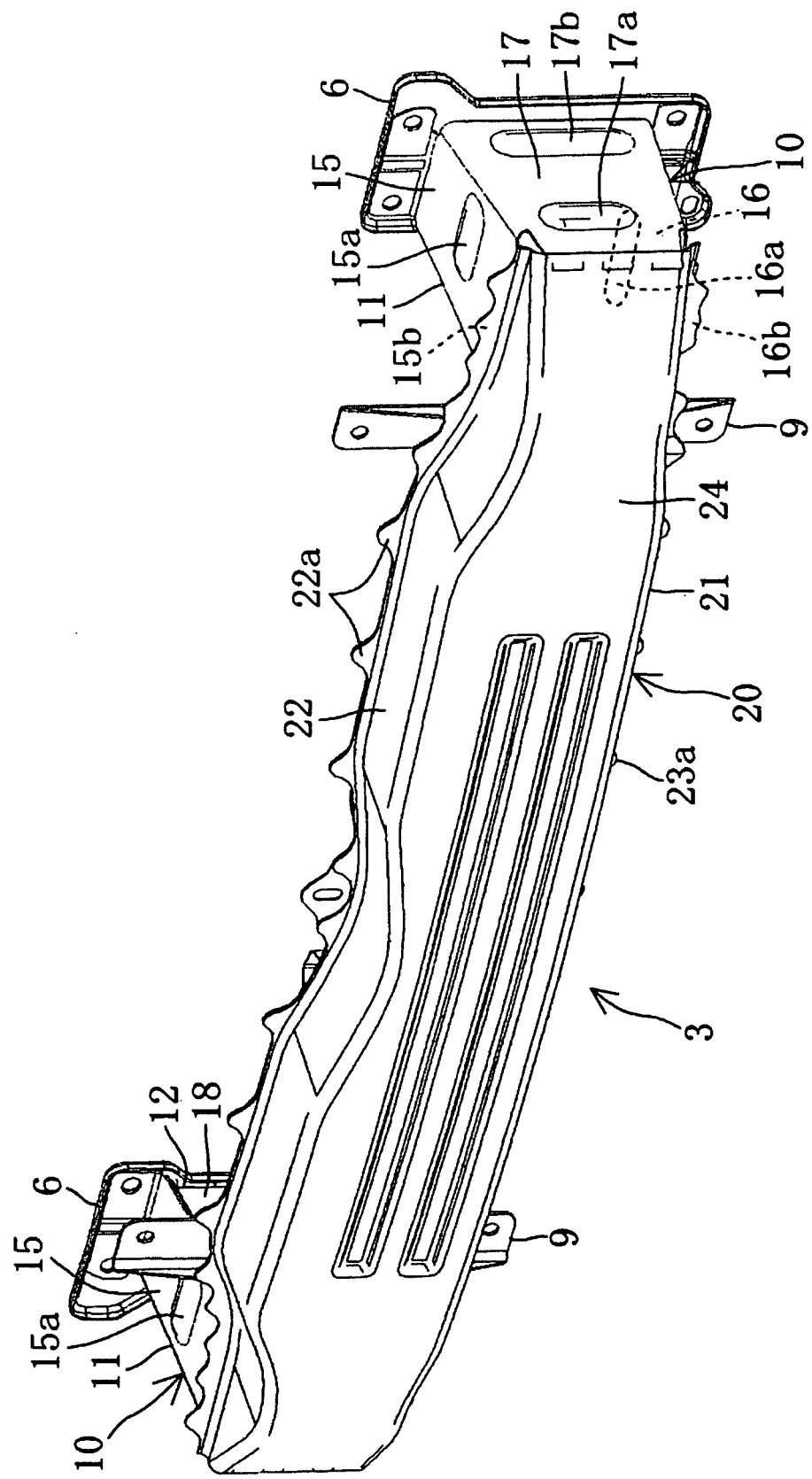
FIG. 7 is a perspective view of the bumper structure as seen obliquely from the front side with an energy absorbing member removed.

While no bead portions like the unstiffening bead portions 17a, 17b of the outside wall 17 are formed in the inside wall 18 of each crush can 10, a reinforcement bead portion 18c is formed in the elongated portion 18b of the inside wall 18 as shown in FIG. 6. The reinforcement bead portion 18c extends along the longitudinal direction and serves to provide increased longitudinal stiffness to the inside wall 18 of each crush can 10. The inside wall 18 of each crush can 10 further has a flange 18d inwardly bent from a forward end of the elongated portion 18b. Each of the crush cans 10 is structured as thus far described so that the inside wall 18 has greater longitudinal stiffness than the outside wall 17.

The bumper beam 20 includes a beam member 21 having a U-shaped cross section of which open end is directed rearward and a cover plate 25 affixed to the beam member 21 to cover the open end the beam member 21 excluding left and right end portions thereof so that most of the bumper beam 20 forms a closed section. The beam member 21 is made relatively elongate so that the left and right end portions thereof would extend slightly outward beyond the front side frames 2.

The bumper beam 20 (beam member 21) is shaped to gently curve so that a central portion thereof protrudes more frontward than the left and right end portions which are more curved rearwardly than the other portion. The beam member 21 has an upper wall 22, a lower wall 23 and a front wall 24. As shown in FIG. 6, an upwardly bent flange 22a is formed at a rear end of the upper wall 22 while a downwardly bent flange 23a is formed at a rear end of the lower wall 23.

The upper and lower flanges 15b, 16b of the left and right crush cans 10 are welded to left and right end portions of the upper and lower flanges 22a, 23a of the beam member 21 while forward ends of the outside walls 17 of the left and right crush cans 10 are welded to left and right end portions of the front wall 24 of the beam member 21, respectively. The elongated portion 18b of the inside wall 18 of each crush can 10 has a vertical width (height) smaller than the distance between the upper wall 22 and the lower wall 23 of the beam member 21. With the elongated portion 18b of the inside wall 18 of the crush can 10 on each side fitted into the U-shaped section of the beam member 21, the flange 18d formed at the forward end of the elongated portion 18b of the inside wall 18 is welded to a rear surface of the front wall 24 of the beam member 21.

The cover plate 25 has a lateral length smaller than the distance between the left and right crush cans 10. There are formed flanges 25a, 25b at upper and lower ends of the cover plate 25 as shown in FIG. 5. These flanges 25a, 25b are welded to the upper and lower flanges 22a, 23a of the beam member 21, respectively. In addition, there are formed rearwardly bent flanges 25c at left and right ends of the cover plate 25. The left and right flanges 25c of the cover plate 25 are welded to the forward ends of the basal inside wall portions 18a of the inside walls 18 the left and right crush cans 10, respectively. As shown in FIG. 5, there are formed a plurality of holes 25d in the cover plate 25 for the sake of weight reduction.

Referring again to FIG. 5, a pair of vertically elongate mounting plates 9 are affixed to the left and right ends of the cover plate 25. The shroud 4 disposed between the left and right crush cans 10 at the rear of the bumper beam 20 is fixed to the pair of mounting plates 9, so that part of the weight of the shroud 4 is supported by the bumper beam 20 by way of the mounting plates 9.

As previously mentioned, the energy absorbing member 30 is made of a plastic foam material and attached to the front side of the bumper beam 20 in the area excluding the left and right end portions thereof. The energy absorbing member 30 is shaped such that the thickness thereof measured along the longitudinal direction gradually increases inward from both sides toward the centerline of the vehicle 1. Although not illustrated, the energy absorbing member 30 is affixed to the bumper beam 20 by means of plural sets of bolts and nuts. Therefore, a plurality of bolt holes are formed in the energy absorbing member 30 and the bumper beam 20.

The bumper face 35 is configured to cover a wide area of the front portion the vehicle 1 including not only the front of the energy absorbing member 30 but also upper and lower areas of the energy absorbing member 30 and both left and right outer areas at the front of the pairs of crush cans 10 and front side frames 2.

The working and advantages of the bumper structure 3 of the present embodiment are described below.

When a frontal vehicle collision occurs, an impact force is exerted through the bumper face 35 onto the energy absorbing member 30, the bumper beam 20 and then the crush cans 10. In the event of a full-wrap collision in which an obstacle crashes into the bumper structure 3 generally straight from a front direction as shown by an arrow in FIG. 4, for example, the impact force is divided approximately into halves and exerted almost equally onto the two crush cans 10 through the bumper beam 20. In the case of the full-wrap collision, the inside walls 18 of the crush cans 10 having higher longitudinal stiffness than the outside walls 17 thereof contribute to increasing impact withstand capability of the crush cans 10 to a greater extent. Thus, if the full-wrap collision occurs at a speed below a specified speed limit (e.g., 8 km/h), neither of the two crush cans 10 crushes and impact energy is absorbed by warpage of the energy absorbing member 30 and the bumper beam 20.

Figure 9:
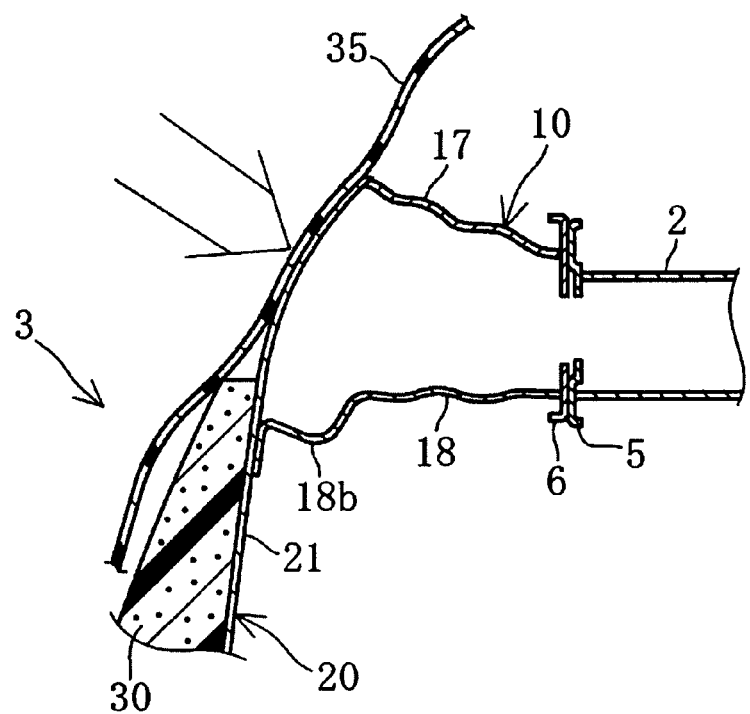
FIG. 9 is an enlarged fragmentary plan view in section showing how the same principal part of the bumper structure shown in FIG. 8 deforms in the event of an offset collision.

In the event of an oblique offset collision in which an obstacle crashes into the bumper structure 3 at an oblique angle, involving part (left or right side) of the bumper width, as shown by an arrow in FIG. 8, an impact force exerted through the bumper beam 20 concentrates on one of the crush cans 10. In this case, the impact force is transmitted to one of the crush cans 10 primarily through the outside wall 17 thereof having relatively lower stiffness. The impact energy caused by the offset collision can hardly be absorbed by warpage of the energy absorbing member 30 and the bumper beam 20. Thus, if the offset collision occurs at a speed equal to or above the aforementioned specified speed limit (e.g., 8 km/h), the outside wall 17 of one of the crush cans 10 easily deforms compressively at first and then the inside wall 18 of the crush can 10 deforms compressively. As one of the crush cans 10 sufficiently crushes in a reliable manner as shown in FIG. 9, the bumper structure 3 of the embodiment can effectively absorb the impact energy produced by the offset collision.

As thus far described, the bumper structure 3 of the foregoing embodiment includes the pair of crush cans 10, the bumper beam 20, the energy absorbing member 30 and the bumper face 35. Since each of the crush cans 10 is structured such that the inside wall 18 has higher longitudinal stiffness than the outside wall 17, the inside wall 18 contributes to increasing the impact withstand capability of each crush can 10 to a greater extent. Thus, if a full-wrap collision occurs at a speed below the specified speed limit, neither of the two crush cans 10 crushes but the energy absorbing member 30 and the bumper beam 20 warp and absorb the impact energy, thereby serving to reduce cost and time needed for repairing damage to the crush cans 10 in an effective fashion.

On the other hand, if an offset collision occurs at a speed equal to or above the specified speed limit, the outside wall 17 of the crush can 10 on one side (left or right) having lower longitudinal stiffness expedites compressive deformation of the crush can 10. Since one of the crush cans 10 sufficiently crushes and absorbs the impact energy in this kind of offset collision, the bumper structure 3 of the present embodiment serves to prevent as much as possible the earlier-mentioned prior art problem caused by insufficient crushing of the crush can 10 and insufficient absorption of the impact energy which would result in damage to the front side frame 2 on one side and a large amount of repairing cost.

According to the foregoing embodiment, the plurality of vertically extending unstiffening bead portions 17a, 17b are formed only in the outside wall 17 of each crush can 10. This makes it possible to make the longitudinal stiffness of the inside wall 18 of each crush can 10 higher than that of the outside wall 17 thereof in a reliable fashion with a simple arrangement.

Furthermore, the inside wall 18 of the crush can 10 on each side (left and right) has the elongated portion 18b extending more frontward than the other portions of the crush can 10 and welded to the rear surface of the front wall 24 of the beam member 21 (bumper beam 20) in the foregoing embodiment. This arrangement of the bumper structure 3 ensures that the impact force acting on each crush can 10 is distributed over an entirety thereof. With this arrangement, the inside wall 18 contributes to increasing the impact withstand capability of each crush can 10 in a reliable fashion, which is advantageous in reliably preventing crushing of the crush cans 10 in the event of a full-wrap collision occurring at a speed below the specified speed limit.

Furthermore, the inside wall 18 of the crush can 10 on each side has the reinforcement bead portion 18c formed in the elongated portion 18b in the bumper structure 3 of the foregoing embodiment. The provision of the reinforcement bead portion 18c serves to increase longitudinal stiffness of the elongated portion 18b of the inside wall 18 of each crush can 10. This makes it possible to prevent crushing of the crush cans 10 in the event of a full-wrap collision occurring at a speed below the specified speed limit in a more reliable fashion.

Furthermore, the elongated portion 18b of the inside wall 18 of each crush can 10 is bent to deflect frontwardly inward so that the elongated portion 18b of the inside wall 18 can easily deform inward in the foregoing embodiment. This arrangement of the bumper structure 3 serves to effectively prevent such a situation that the elongated portion 18b remains straight and keeps the crush can 10 from crushing in the event of an offset collision occurring at a speed equal to or above the specified speed limit.

Additionally, the bumper beam 20 is shaped to gently curve so that the central portion thereof protrudes more frontward than the left and right end portions, and the energy absorbing member 30 attached to the front side of the bumper beam 20 in the area excluding the left and right end portions thereof is shaped such that the thickness measured along the longitudinal direction gradually increases inward from both sides toward the centerline of the vehicle 1 in the foregoing embodiment. This arrangement of the embodiment serves to effectively enhance external appearance of the bumper structure 3. Needless to say, this design of the bumper structure 3 makes it almost impossible to expect the energy absorbing member 30 and the bumper beam 20 to absorb the impact energy by warpage in the event of an offset collision at a speed equal to or above the specified speed limit. Nevertheless, the bumper structure 3 is so constructed that one of the crush cans 10 crushes in a reliable fashion in the event of the aforementioned kind of offset collision and, therefore, the impact energy is sufficiently absorbed by the crushing of one crush can 10.

Figure 10:
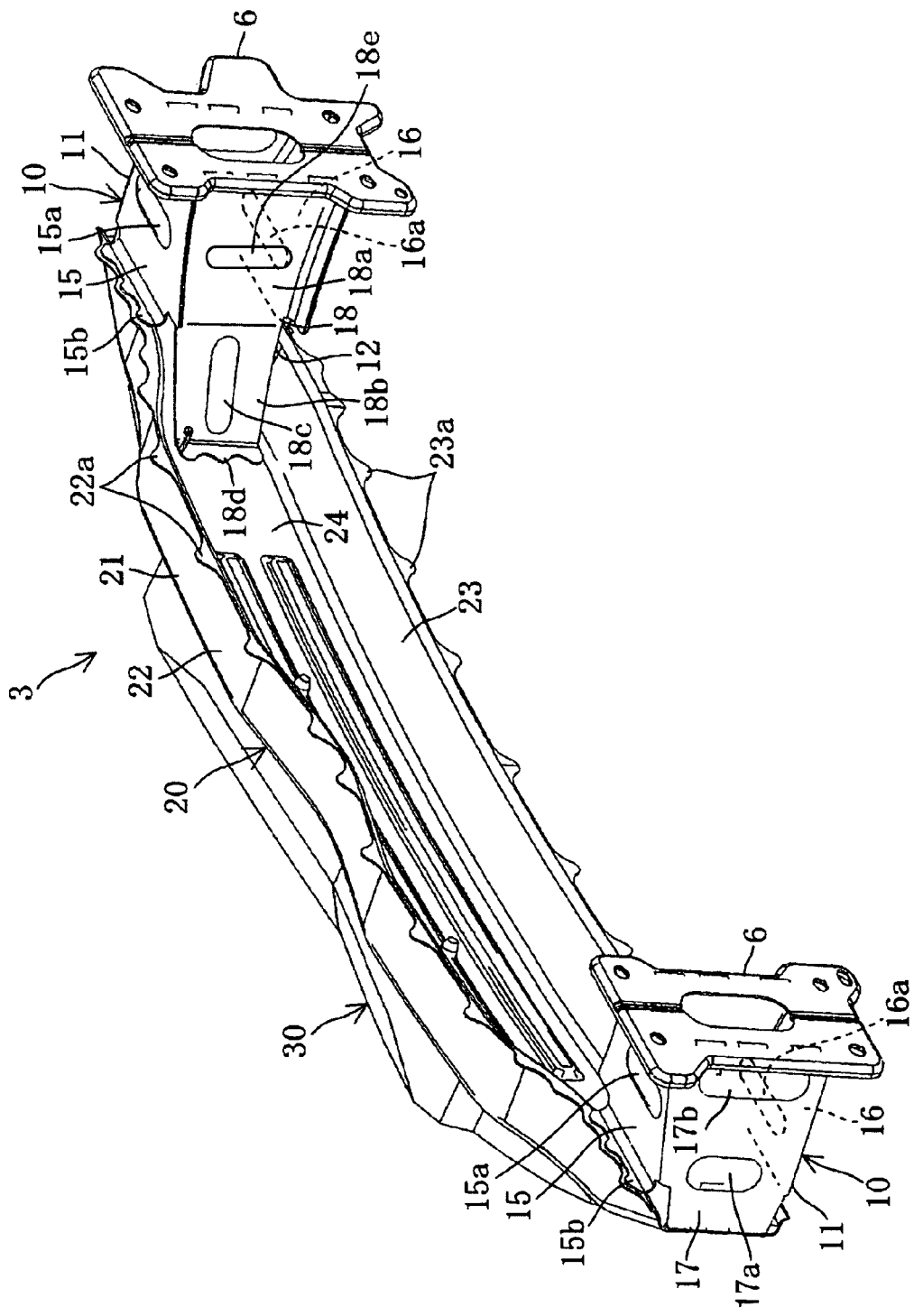
FIG. 10 is a perspective view of a bumper structure corresponding to FIG. 6 showing a variation of the bumper structure of the preferred embodiment of the invention.

As one variation of the foregoing preferred embodiment of the invention, the bumper structure 3 may be modified such that there are formed a plurality of (e.g., two) vertically extending outside unstiffening bead portions 17a, 17b in the outside wall 17 of each crush can 10 and there is (are) formed a smaller number of (e.g., one) vertically extending inside unstiffening bead portion(s) 18e in the inside wall 18 of each crush can 10 as shown in FIG. 10. This variation of the embodiment makes it possible to construct the bumper structure 3 in such a way that the inside wall 18 of each crush can 10 has higher longitudinal stiffness than the outside wall 17, yet ensuring that the crush can 10 on each side has such a level of overall stiffness that would permit the crush can 10 to properly deform compressively when acted upon by an impact force.

According to the invention, the numbers of the unstiffening bead portions 17a, 17b, 18e and the reinforcement bead portion(s) 18c may be varied as appropriate. Moreover, the bumper structure 3 of the foregoing embodiment may be so modified that each of the crush cans 10 has no unstiffening bead portions 17a, 17b, 18e in the outside wall 17 and the inside wall 18 but the inside wall 18 has higher longitudinal stiffness than the outside wall 17 by differentiating the wall thickness or material of the outside wall 17 and the inside wall 18. It is to be understood that the above-described arrangements are simply illustrative of the invention. Various modifications and alterations of the aforementioned arrangements will be apparent to those skilled in the art without departing from the scope and spirit of the present invention.

In summary, a vehicle bumper structure of the invention includes a pair of forward-directed left and right crush cans attached respectively to forward ends of left and right front side frames, a bumper beam attached to forward ends of the left and right crush cans to extend transversely therebetween, an energy absorbing member attached to a front side of the bumper beam at least in an area excluding left and right end portions thereof, the energy absorbing member having lower stiffness than the bumper beam and the crush cans, and a bumper face disposed in front of the energy absorbing member. In this vehicle bumper structure, each of the crush cans has an outside wall facing outward and an inside wall facing inward, the inside wall having higher longitudinal stiffness than the outside wall.

This vehicle bumper structure of the invention includes the pair of crush cans, the bumper face, the energy absorbing member and the bumper face. Since each of the crush cans is structured such that the inside wall has higher longitudinal stiffness than the outside wall, the inside wall contributes to increasing impact withstand capability of each crush can to a greater extent. Thus, if a full-wrap collision occurs at a speed below a specified speed limit (e.g., 8 km/h), neither of the two crush cans crushes but the energy absorbing member and the bumper beam warp and absorb impact energy, thereby serving to reduce cost and time needed for repairing damage to the crush cans in an effective fashion.

On the other hand, if an offset collision occurs at a speed equal to or above the specified speed limit, the outside wall of the crush can on one side (left or right) having lower longitudinal stiffness expedites compressive deformation of the crush can. Since one of the crush cans sufficiently crushes and absorbs impact energy caused by the offset collision, the bumper structure of the invention can prevent as much as possible the earlier-mentioned prior art problem caused by insufficient crushing of the crush can and insufficient absorption of the impact energy which would result in damage to the front side frame on one side and a large amount of repairing cost.

In one preferable feature of the invention, the vehicle bumper structure is constructed such that a plurality of vertically extending unstiffening bead portions are formed only in the outside wall of each of the crush cans.

According to this feature of the invention, the longitudinal stiffness of the inside wall of each crush can be made higher than that of the outside wall thereof in a reliable fashion with a simple arrangement.

In another preferable feature of the invention, the vehicle bumper structure is constructed such that a plurality of vertically extending outside unstiffening bead portions are formed in the outside wall of each of the crush cans and a smaller number of vertically extending inside unstiffening bead portions are formed in the inside wall of each of the crush cans.

According to this feature of the invention, the vehicle bumper structure can be constructed in such a way that the inside wall of each crush can has higher longitudinal stiffness than the outside wall, yet ensuring that the crush can on one side has such a level of overall stiffness that would permit the crush can to properly deform compressively when acted upon by an impact force.

In another preferable feature of the invention, the vehicle bumper structure is constructed such that the inside wall of each of the crush cans has an elongated portion extending more frontward than the other portion of each crush can, the elongated portion being joined to a rear surface of a front wall of the bumper beam.

According to this feature of the invention, an impact force acting on each crush can is distributed over an entirety thereof. With this arrangement, the inside wall contributes to increasing the impact withstand capability of each crush can in a reliable fashion, which is advantageous in reliably preventing crushing of the crush cans in the event of a full-wrap collision occurring at a speed below the specified speed limit.

In still another preferable feature of the invention, the vehicle bumper structure is constructed such that a reinforcement bead portion extending along the longitudinal direction is formed in the elongated portion of each of the crush cans.

The provision of the reinforcement bead portion serves to increase longitudinal stiffness of the elongated portion of the outside wall of each crush can. This makes it possible to prevent crushing of the crush cans in the event of a full-wrap collision occurring at a speed below the specified speed limit in a more reliable fashion.

In yet another preferable feature of the invention, the vehicle bumper structure is constructed such that the elongated portion of each of the crush cans is bent to deflect frontwardly inward.

This arrangement of the vehicle bumper structure serves to effectively prevent such a situation that the elongated portion of the inside wall remains straight and keeps the crush can from crushing in the event of an offset collision occurring at a speed equal to or above the specified speed limit.

In a further preferable feature of the invention, the vehicle bumper structure is constructed such that the bumper beam is shaped to gently curve so that a central portion thereof protrudes more frontward than the left and right end portions, and the energy absorbing member attached to the front side of the bumper beam in the area excluding the left and right end portions thereof is shaped in such a fashion that the thickness thereof measured along the longitudinal direction gradually increases inward from both sides toward a centerline.

This arrangement serves to effectively enhance external appearance of the vehicle bumper structure while ensuring that the impact energy is sufficiently absorbed by crushing of one crush can.

This application is based on Japanese Patent Application serial No. 2006-234971, filed in Japan Patent Office on Aug. 31, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle bumper structure comprising:
a pair of vehicle forward-directed left and right crush cans having a closed cross section and attached respectively to forward ends of left and right front side frames;
a bumper beam attached to forward ends of said left and right crush cans to extend therebetween in a vehicle widthwise direction;
an energy absorbing member attached to a front side of said bumper beam at least in an area excluding left and right end portions thereof in the vehicle widthwise direction, said energy absorbing member having lower stiffness than said bumper beam and said crush cans; and
a bumper face disposed in front of said energy absorbing member;
wherein each of said crush cans has an outside wall facing outward in the vehicle widthwise direction and an inside wall facing inward in the vehicle widthwise direction, the inside wall having higher stiffness in a vehicle longitudinal direction than the outside wall, and
wherein a plurality of vertically extending unstiffening bead portions are formed only in the outside wall of each of said crush cans.

2. A vehicle bumper structure comprising:
a pair of vehicle forward-directed left and right crush cans having a closed cross section and attached respectively to forward ends of left and right front side frames;
a bumper beam attached to forward ends of said left and right crush cans to extend therebetween in a vehicle widthwise direction;
an energy absorbing member attached to a front side of said bumper beam at least in an area excluding left and right end portions thereof in the vehicle widthwise direction, said energy absorbing member having lower stiffness than said bumper beam and said crush cans; and
a bumper face disposed in front of said energy absorbing member;
wherein each of said crush cans has an outside wall facing outward in the vehicle widthwise direction and an inside wall facing inward in the vehicle widthwise direction, the inside wall having higher stiffness in a vehicle longitudinal direction than the outside wall, and
wherein a plurality of vertically extending outside unstiffening bead portions are formed in the outside wall of each of said crush cans and a smaller number of vertically extending inside unstiffening bead portions are formed in the inside wall of each of said crush cans.

3. The vehicle bumper structure according to claim 1, wherein the inside wall of each of said crush cans has an elongated portion extending in the vehicle frontward direction more than the outside wall of each crush can, the elongated portion being joined to a rear surface of a front wall of said bumper beam.

4. The vehicle bumper structure according to claim 3, wherein a reinforcement bead portion extending in the vehicle longitudinal direction is formed in the elongated portion of each of said crush cans to increase stiffness of the elongated portion in the vehicle longitudinal direction.

5. The vehicle bumper structure according to claim 3, wherein the elongated portion of each of said crush cans is bent to deflect inward in the in the vehicle widthwise direction as extending in the in the vehicle longitudinal direction.

6. The vehicle bumper structure according to claim 1, wherein said bumper beam is shaped to gently curve so that a central portion thereof in the vehicle widthwise direction protrudes more frontward than the left and right end portions in the vehicle widthwise direction, and said energy absorbing member attached to the front side of said bumper beam in the area excluding the left and right end portions thereof in the vehicle widthwise direction is shaped in such a fashion that the thickness thereof measured along the vehicle longitudinal direction gradually increases inward from both sides toward a centerline in the vehicle widthwise direction.

7. The vehicle bumper structure according to claim 1, wherein said vertically extending unstiffening bead portions are formed on the outside wall in such a manner that the outside wall with said unstiffening portions is deformed easier against a longitudinally acting compressive stress than the outside wall without said unstiffening portions.

* * * * *

UNITED STATES PATENT AND TRADEMARK OFFICE
CERTIFICATE OF CORRECTION

| | | |
|---|---|---|
| PATENT NO. | : 8,662,546 B2 | |
| APPLICATION NO. | : 11/892802 | |
| DATED | : March 4, 2014 | |
| INVENTOR(S) | : Kizaki et al. | |

It is certified that error appears in the above-identified patent and that said Letters Patent is hereby corrected as shown below:

In the Claims

Column 10, Line 40, In Claim 5, delete "in the in the" and insert -- in the --, therefor.
Column 10, Line 41, In Claim 5, delete "in the in the" and insert -- in the --, therefor.

Signed and Sealed this
Twenty-ninth Day of July, 2014

Michelle K. Lee
*Deputy Director of the United States Patent and Trademark Office*